Oct. 23, 1934.   C. GIANINI   1,977,943
PLANETARY REDUCTION GEARING FOR RADIAL AEROPLANE ENGINES
Filed April 25, 1934   2 Sheets-Sheet 2
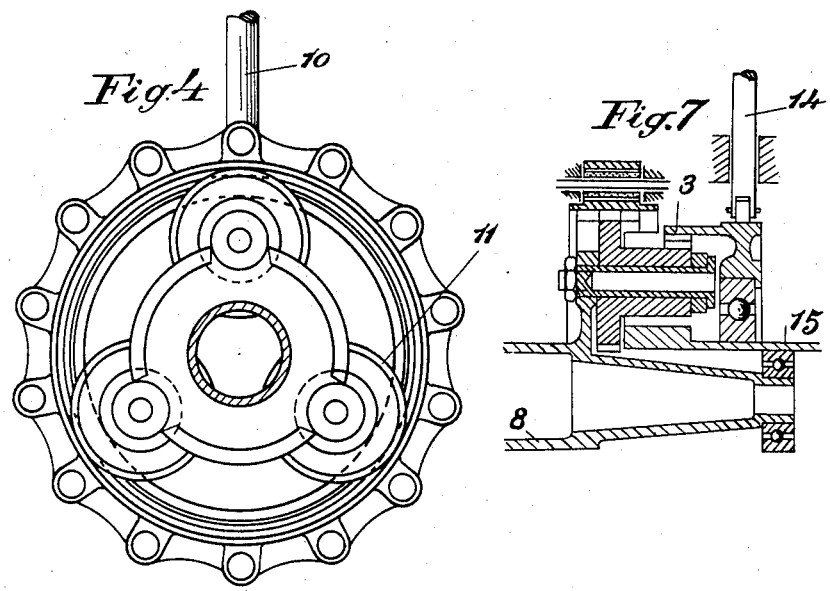
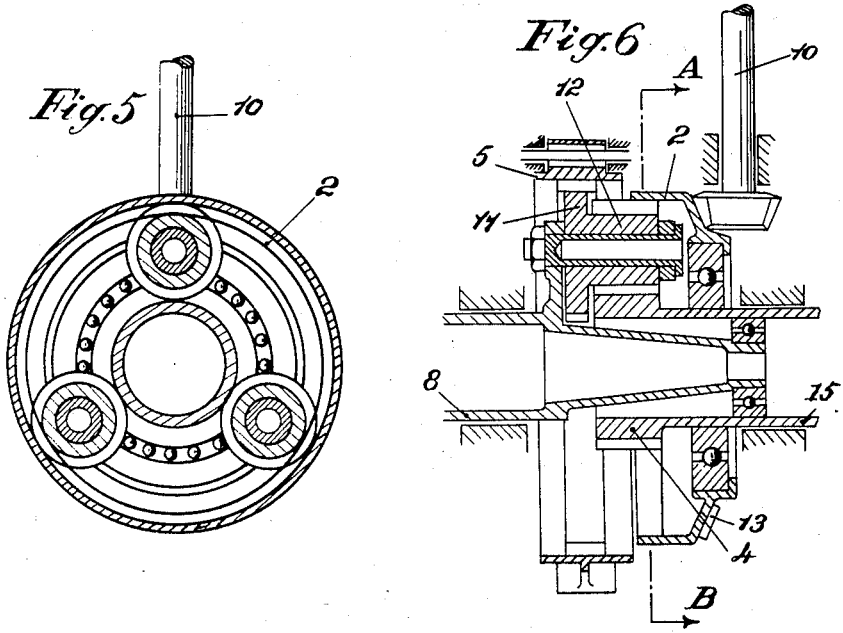
C. Gianini
INVENTOR
By Marks & Clerk
Attys, Patented Oct. 23, 1934

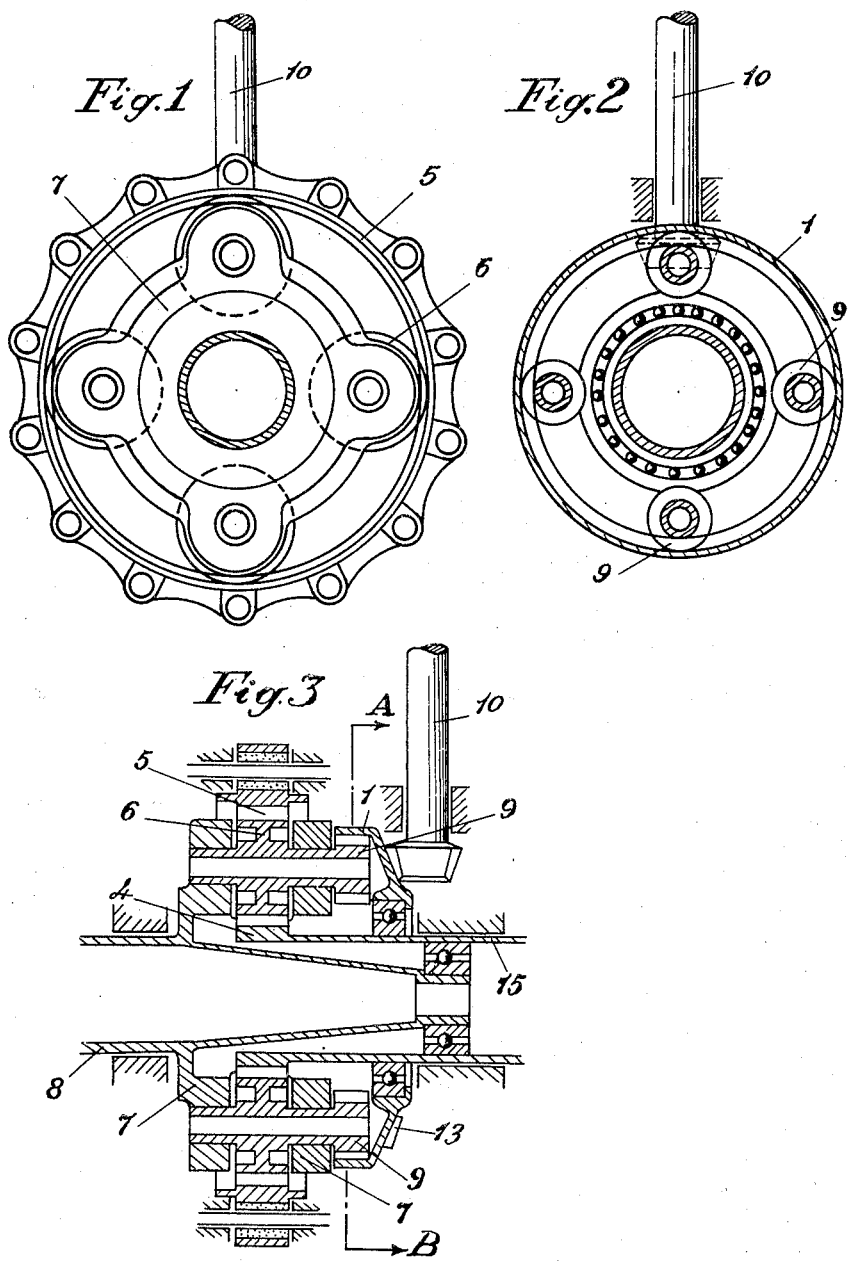

1,977,943

UNITED STATES PATENT OFFICE 1,977,943

PLANETARY REDUCTION GEARING FOR RADIAL AEROPLANE ENGINES

Carlo Gianini, Rome, Italy, assignor to Compagnia Nazionale Aeronautica, Rome, Italy Application April 25, 1934, Serial No. 722,385
In Italy April 20, 1933

2 Claims. (Cl. 74—305)

The present invention relates to planetary reduction gearing for radial aeroplane engines.

In radial aeroplane engines having five, seven or nine or more cylinders, the valve control is usually effected by a single central cam shaft which is provided with a plurality of cams which co-act with radial rods or by means of a sun and planet wheel gearing having a ring of bevel teeth which actuates a plurality of radial shafts which extend from the centre of the radially arranged cylinders to the cylinder heads, where they control their valves by suitable mechanism. In both cases the central driving member must be driven from the engine shaft through reduction gearing for reducing the speed of revolution, for example in the ratio of 8:1 or 10:1. Hitherto this has been effected by means of gearing employed solely for this purpose.

According to the present invention, in aeroplane engines having a reduction gearing between the engine shaft and the propeller shaft, this gearing is combined to form a single unit with the reduction gearing for driving the central cam shaft or the planetary gear which actuates the radial shafts of the valve controlling mechanism, so that parts of the gear exercise a double function.

The invention will now be explained in detail with the aid of the accompanying drawings, which shows by way of example two embodiments of the invention, in each of which the reduction gearing for the propeller shaft simultaneously actuates the valve controlling mechanism, whether the valves are controlled by radial shafts or by means of a central cam shaft and valve rods. In the drawings Figure 1 is a front elevation of a reduction gearing in accordance with the invention;

Figure 2 is a section on the line A—B of Figure 3 at right angles to the axis, and Figure 3 is a section along the axis of the reduction gearing;

Figure 4 is a front elevation of a second form of construction of the reduction gearing in accordance with the invention;

Figure 5 is a section similar to Figure 2;

Figure 6 is a section similar to Figure 3, and

Figure 7 is a section through the axis, showing the arrangement when the valves are controlled by cams and rods.

Referring to the drawings, Figures 1, 2 and 3 illustrate a planetary transmission gear in which one end of the driving shaft 15 is provided with a sun wheel 4 which rotates at the same speed as this shaft. An internally toothed annular wheel 5 forms a fixed unit with the casing of the gearing. The planet wheels 6 are carried by a frame 7 and revolve around the main axis carrying this frame with them. The frame 7, however, is integral or rigidly connected with the driven propeller shaft 8 and this, therefore, rotates at a lower speed than the engine shaft 15.

The shafts of the planet wheels 6 are extended beyond one side of the frame 7 and these extending ends are formed as or provided with pinions 9 which are in engagement with the internally toothed annular wheel 1 which, if the desired ratio of transmission enables this to be done, may be replaced by an externally toothed wheel. The pinions 9 thus rotate the annular wheel 1, the angular velocity of this wheel becoming less the more nearly the diameter of the pinions 9 approaches the diameter of the planet wheels 6. The annular wheel 1 is provided externally with a ring of bevel teeth 13 by which all the radial valve-controlling shafts 10 are driven.

Figures 4, 5 and 6 illustrate a modified form of construction of the planetary reduction gearing which differs from that which has just been described in that each planet wheel has two coaxial sets of teeth 11 and 12, which are of different diameters but are formed on the same wheel. In the figures three planet wheels have been shown, but the number may be varied as desired. These wheels are mounted on the frame on which they are carried in such a manner that the sets of teeth of the same diameter lie in the same plane. One of these sets, namely 11, meshes with the ring of teeth 5 and the other with the teeth of the sun wheel 4 on the driving shaft 15.

If the two rings of teeth 11 and 12 were of the same diameter, the arrangement would be equivalent to that of the construction which has previously been described. The arrangement shown in Figures 4 to 6 is more suitable for lower reduction ratios. The teeth 12 are not only in engagement with the sun wheel 4 but are also in engagement on the outside with the annular wheel 2 which corresponds with the annular wheel of the previous example and transmits its movement in the same way by means of the ring of bevel teeth 13 to the radial valve controlling rods 10. In this case also the reduction ratio becomes greater the more nearly the diameter of the ring of teeth 12 approaches that of the teeth 11.

As may be seen from Figure 7, this second form of construction can also be employed as a reduction gearing for driving a central cam shaft 3 which actuates the valve controlling mechanism through the agency of rods 14 and takes the place of the ring of bevel teeth 13 in the two constructional examples previously described.

The main advantage of all three forms of construction is that the same structural parts which form the reduction gearing between the motor shaft and the propeller shaft also act as the reduction gearing for the valve controlling mechanism, no matter whether this is effected by rotary movement or by intermittent longitudinal movement. The planet wheels and their bearings, the sun wheel on the driving shaft and the fixed ring of teeth on the casing are all common to both the reduction gears. There is, therefore, a considerable saving in weight which is of great importance in the case of aeroplane engines.

What I claim is:

1. A planetary reduction gearing for radial aeroplane engines, comprising a sun wheel on the engine shaft, planet wheels meshing with it and carried by a frame revolving with these around the sun wheel at a reduced speed and connected with the propeller shaft, a second set of teeth of different diameter on the planet wheels meshing with an annular toothed wheel, and a conical gearing on this annular toothed wheel driving a gear on each of the radial shafts of a valve controlling device.

2. A planetary reduction gearing for radial aeroplane engines, comprising a sun wheel on the engine shaft, and planet wheels carried by a frame connected with the propeller shaft and bearing two coaxial sets of teeth, of which the larger one is devolving on a ring of teeth of the casing and the smaller one is driven by the sun wheel and meshes also with an annular toothed wheel bearing a conical gearing driving a gear on each of the radial shafts of a valve controlling device.

CARLO GIANINI.